(12) United States Patent
Qi et al.

(10) Patent No.: US 12,557,065 B2
(45) Date of Patent: Feb. 17, 2026

(54) METHOD AND APPARATUS FOR LOCATING TERMINAL, COMPUTER DEVICE, AND STORAGE MEDIUM

(71) Applicant: PURPLE MOUNTAIN LABORATORIES, Jiangsu (CN)

(72) Inventors: Wangdong Qi, Jiangsu (CN); Shengheng Liu, Jiangsu (CN)

(73) Assignee: PURPLE MOUNTAIN LABORATORIES, Jiangsu (CN)

( * ) Notice: Subject to any disclaimer, the term of this patent is extended or adjusted under 35 U.S.C. 154(b) by 363 days.

(21) Appl. No.: 18/034,698

(22) PCT Filed: Oct. 30, 2020

(86) PCT No.: PCT/CN2020/125255
§ 371 (c)(1),
(2) Date: Apr. 29, 2023

(87) PCT Pub. No.: WO2022/088036
PCT Pub. Date: May 5, 2022

(65) Prior Publication Data
US 2023/0397152 A1 Dec. 7, 2023

(51) Int. Cl.
*H04W 4/02* (2018.01)
*H04W 64/00* (2009.01)

(52) U.S. Cl.
CPC ........... *H04W 64/003* (2013.01); *H04W 4/02* (2013.01); *H04W 64/006* (2013.01)

(58) Field of Classification Search
CPC ..... H04W 64/003; H04W 4/029; H04W 4/80; H04W 64/006; H04W 4/02
See application file for complete search history.

(56) References Cited

U.S. PATENT DOCUMENTS

| | | |
|---|---|---|
| 9,763,166 B2 * | 9/2017 | Hyde ................ H04W 40/246 |
| 2014/0204782 A1 | 7/2014 | Geirhofer |

(Continued)

FOREIGN PATENT DOCUMENTS

| | | |
|---|---|---|
| CN | 106970353 A | 7/2017 |
| CN | 109462886 A | 3/2019 |

(Continued)

OTHER PUBLICATIONS

Jiang Xiaoping, Liu Jian, Ding Hao, "Trajectory Tracking Method Based on CSI Discrete Fingerprint", Journal of South-Central University for Nationalities( Nat . Sci . Edition), vol. 37 No . 4, Dec. 31, 2018.

(Continued)

*Primary Examiner* — Jinsong Hu
(74) *Attorney, Agent, or Firm* — The Sun IP Law (57) ABSTRACT

Provided is a method for locating a terminal. The method includes: reading speed information; determining a plurality of initial locating positions in a region to be located, and respectively obtaining a trajectory corresponding to each initial locating position of the plurality of initial locating positions by calculating according to the speed information; acquiring a position of a base station, and obtaining theoretical channel state information of trajectory points in the trajectory corresponding to each initial locating position by calculating according to the position of the base station; acquiring actual channel state information of the trajectory points in the trajectory corresponding to each initial locating position; and determining a target locating position from the plurality of initial locating positions according to the theoretical channel state information and the actual channel state information.

17 Claims, 5 Drawing Sheets

(56) References Cited

U.S. PATENT DOCUMENTS

| | | | |
|---|---|---|---|
| 2017/0256063 A1 | 9/2017 | Baek et al. | |
| 2018/0077671 A1* | 3/2018 | Lee | H04W 64/006 |
| 2018/0341004 A1* | 11/2018 | Kautz | G01S 5/0249 |
| 2019/0302220 A1* | 10/2019 | Kumar | H04W 4/44 |
| 2019/0335348 A1* | 10/2019 | Hou | H04W 4/06 |
| 2025/0203554 A1* | 6/2025 | Zorgui | H04W 64/00 |

FOREIGN PATENT DOCUMENTS

| | | | |
|---|---|---|---|
| CN | 109640269 A | 4/2019 | |
| CN | 110636466 A | 12/2019 | |
| CN | 110856100 A | 2/2020 | |
| CN | 111585672 A | 8/2020 | |
| CN | 111601253 A | 8/2020 | |
| CN | 111818452 A | 10/2020 | |
| WO | 2017180698 A1 | 10/2017 | |

OTHER PUBLICATIONS

IEEE Xplore, Luis García Ordóñez, et al., "CSI-based Outdoor Localization for Massive MIMO: Experiments with aLearning Approach", Aug. 31, 2018.

The search report of CN application No. 2022801069046 issued on Mar. 13, 2025.

Pengpeng Chen, et al., Smartphone-Based Indoor Fingerprinting Localization Using Channel State Information IEEE Access(vol. 7) Dec. 13, 2019.

\* cited by examiner

METHOD AND APPARATUS FOR LOCATING TERMINAL, COMPUTER DEVICE, AND STORAGE MEDIUM

TECHNICAL FIELD

The disclosure relates to a method and apparatus for locating a terminal, a computer device, and a storage medium.

BACKGROUND

With the development of locating technology, the radio locating technology for mobile terminals comes around. The radio locating technology for mobile terminals refers that: in a radio mobile communication network, characteristic parameters of a received radio wave are measured; and a geographical position of the mobile terminal is estimated by adopting a specific algorithm according to the measured parameters of the received radio wave, so as to provide accurate terminal position information and services.

Conventionally, radio locating technology for mobile terminals principally depends on a satellite locating system. The satellite locating system requires a special locating chip, fails to realize precise locating in the case that signals are blocked (such as indoor), and has a risk that locating signals are disturbed. When the satellite locating system is unavailable, the terminal may still be located by conventionally measuring distances from the terminal to a plurality of base stations, distance differences between the distances, or directions of the terminal relative to the base stations. However, in many cases, only one base station capable of communication with the terminal can be found. With a single base station, merely rough locating within the communication coverage range can be achieved, while precise locating of the mobile terminal is still unobtainable without effective means.

SUMMARY

According to various examples disclosed by the disclosure, provided are a method and apparatus for locating a terminal, a computer device, and a storage medium. Provided is a method for locating a terminal. The method for locating a terminal includes:

reading speed information;
determining a plurality of initial locating positions in a region to be located, and respectively obtaining a trajectory corresponding to each initial locating position of the plurality of initial locating positions by calculating according to the speed information;
acquiring a position of a base station, and obtaining theoretical channel state information of trajectory points in the trajectory corresponding to each initial locating position by calculating according to the position of the base station;
acquiring actual channel state information of the trajectory points in the trajectory corresponding to each initial locating position; and
determining a target locating position from the plurality of initial locating positions according to the theoretical channel state information and the actual channel state information.

Further provided is an apparatus for locating a terminal. The apparatus for locating a terminal includes:

a reading component, configured to read speed information;

a trajectory determination component, configured to determine a plurality of initial locating positions in a region to be located, and respectively obtain a trajectory corresponding to each initial locating position of the plurality of initial locating positions by calculating according to the speed information;
a theoretical value component, configured to acquire a position of a base station, and obtain theoretical channel state information of trajectory points in the trajectory corresponding to each initial locating position by calculating according to the position of the base station;
an actual value calculation component, configured to acquire actual channel state information of the trajectory points in the trajectory corresponding to each initial locating position; and
a locating component, configured to determine a target locating position from the plurality of initial locating positions according to the theoretical channel state information and the actual channel state information.

Further provided is a computer device. The computer device includes a memory and at least one processor, the memory storing a computer-readable instruction, and when executed by the at least one processor, the computer-readable instruction causing the at least one processor to execute the following actions:

reading speed information;
determining a plurality of initial locating positions in a region to be located, and respectively obtaining a trajectory corresponding to each initial locating position of the plurality of initial locating positions by calculating according to the speed information;
acquiring a position of a base station, and obtaining theoretical channel state information of trajectory points in the trajectory corresponding to each initial locating position by calculating according to the position of the base station;
acquiring actual channel state information of the trajectory points in the trajectory corresponding to each initial locating position; and
determining a target locating position from the plurality of initial locating positions according to the theoretical channel state information and the actual channel state information.

Further provided is one or more non-volatile computer-readable storage media, storing a computer-readable instruction, when executed by at least one processor, the computer-readable instruction causing the at least one processor to execute the following actions:

reading speed information;
determining a plurality of initial locating positions in a region to be located, and respectively obtaining a trajectory corresponding to each initial locating position of the plurality of initial locating positions by calculating according to the speed information;
acquiring a position of a base station, and obtaining theoretical channel state information of trajectory points in the trajectory corresponding to each initial locating position by calculating according to the position of the base station;
acquiring actual channel state information of the trajectory points in the trajectory corresponding to each initial locating position; and
determining a target locating position from the plurality of initial locating positions according to the theoretical channel state information and the actual channel state information.

Details in one or more examples of the disclosure are set forth in the accompanying drawings and the description below. Other features and advantages of the disclosure will become apparent from the description, the accompanying drawings, and the claims.

BRIEF DESCRIPTION OF THE DRAWINGS

In order to describe the technical solutions in the examples of the disclosure more clearly, the accompanying drawings required for describing the examples are briefly described below. Obviously, the accompanying drawings in the following description show merely some examples of the disclosure, and those of ordinary skill in the art can also derive other accompanying drawings from these accompanying drawings without making creative efforts.

DETAILED DESCRIPTION OF THE EMBODIMENTS

In order to make the technical solutions and advantages of the disclosure clearer, the disclosure will be further described in detail below with reference to the accompanying drawings. It should be understood that the specific examples described herein are merely illustrative of the disclosure and are not intended to limit the disclosure.

Figure 1:
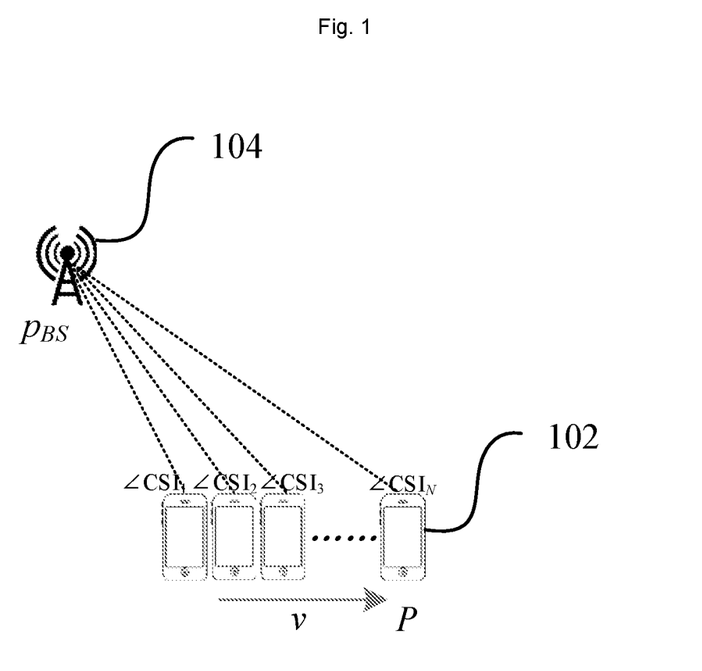
FIG. 1 is an application scenario diagram of a method for locating a terminal according to one or more examples.

A method for locating a terminal provided by the disclosure may be applied to an application environment shown in FIG. 1. A terminal 102 communicates with a base station 104 through a network. The terminal 102 may read speed information of the terminal 102, and determine a region to be located according to a previous locating position. A plurality of initial locating positions in the region to be located may be determined, so as to obtain trajectories corresponding to the initial locating positions according to a speed. The terminal 102 acquires a position of the base station, obtains theoretical channel state information (CSI) of trajectory points in each trajectory by calculating according to the position of the base station. The terminal 102 may also acquire actual channel state information of the trajectory points in each trajectory, so as to determine a target locating position from the plurality of initial locating positions according to the theoretical channel state information and the actual channel state information. In the method for locating the terminal described above, the terminal is located to improve the terminal locating precision, through the channel state information of the terminal in a communication process between the terminal and the base station, a motion direction and the speed value information provided by an inertial device of the terminal, and in combination with the actual channel state information of a trajectory of a short previous distance of the terminal. The terminal 102 may be, but not limited to, various personal computers, notebook computers, smart phones, tablet computers, and portable wearable devices.

The base station 104, that is, a public mobile communication base station, is a form of a radio station. The base station 104 refers to a radio transceiver that transmits information with a mobile phone terminal through a mobile communication switching center in a certain radio coverage region.

Figure 2:
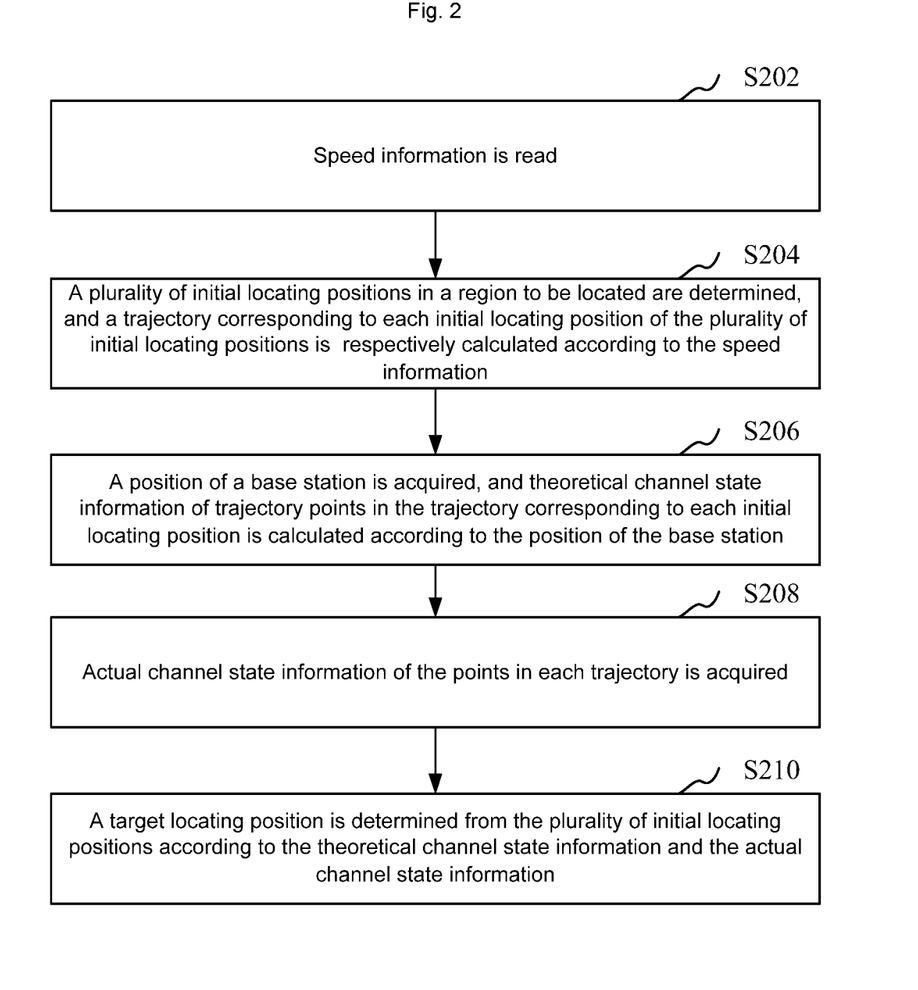
FIG. 2 is a schematic flowchart of a method for locating a terminal according to one or more examples.

In an example, as shown in FIG. 2, a method for locating a terminal is provided. With application of the method to the terminal in FIG. 1 as an example, the method includes:

In step S202: speed information is read.

As at least one alternative embodiment, in a movement process of the terminal, the speed information v may be read in an inertia period configured by the terminal, where the speed information v may include a movement direction and the speed value information.

In step S204: a plurality of initial locating positions in a region to be located are determined, and a trajectory corresponding to each initial locating position of the plurality of initial locating positions is obtained respectively by calculating according to the speed information.

As at least one alternative embodiment, the region to be located may be a region which is determined according to a previous locating position of the terminal, and comprises all possible current positions of the terminal. The region to be located may be determined according to the motion direction and a speed value of the terminal. For example, the region to be located may be a circular region, wherein the previous locating position of the terminal is taken as a circle center of the circular region, and a radius of the circular region is determined according to the speed and a time interval. The time interval may be an interval by which the terminal periodically reads channel state information (CSI) from a communication signal, wherein the interval may be known. For another example, the region to be located may be determined according to a rough locating position obtained by the base station. That is, the region to be located is a region which is determined with the rough locating position as a center and locating precision size as a radius.

The initial locating positions may be a plurality of possible target locating positions of the terminal in the region to be located according to the locating precision. Two or more initial locating positions are provided.

The trajectory is determined according to the initial locating position and the speed information. For example, assuming that the initial locating position of a terminal P to be located is $P_N$, trajectory points $\{p_1, \ldots, p_N\}$ of the initial locating position and N−1 previous points may be acquired according to the speed information v, where $p_i = p_N - v \cdot \Delta t \cdot (N-i)$, i=1, 2, . . . , N.

The terminal may determine a corresponding trajectory according to each initial locating position. Alternatively, since historical trajectories are all the same, positions of N−1 previous points may be set to be the same. In this way, subsequent theoretical channel state information and actual channel state information may be calculated or acquired only once, thereby reducing the processing for determining the trajectories corresponding to the initial locating positions.

In step S206: a position of a base station is acquired, and theoretical channel state information of trajectory points of the trajectory corresponding to each initial locating position is obtained by calculating according to the position of the base station.

As at least one alternative embodiment, the position of the base station is fixed, that is, the accurate position of the base station has been determined when the base station is established. Therefore, when the terminal acquires a signal from the base station, the signal may include the position of the base station.

The theoretical channel state information refers to a theoretical phase value of a direct signal from the base station to each trajectory point on the trajectory.

In step S208: actual channel state information of the trajectory points in the trajectory corresponding to each initial locating position is acquired.

As at least one alternative embodiment, the actual channel state information may be determined according to channel state information historically received by the terminal, and may be a measured phase value.

In step S210: a target locating position is determined from the plurality of initial locating positions according to the theoretical channel state information and the actual channel state information.

As at least one alternative embodiment, after acquiring the theoretical channel state information and the actual channel state information of the trajectory points in each trajectory, the terminal may obtain a score of a corresponding initial locating position by calculating according to the theoretical channel state information and the actual channel state information of each trajectory point, and finally determine the target locating position according to the score, wherein the score of a corresponding initial locating position indicates the possibility of taking as the target locating position.

The score may be acquired by performing equalization processing on the theoretical channel state information and the actual channel state information of the trajectory points in the trajectory. Alternatively, after acquiring the score corresponding to each initial locating position, a hologram may be constructed. Since a value at a correct position in a hologram will be higher, the precise position of the terminal may be determined through the hologram.

According to the method for locating the terminal in the example, through the channel state information of the terminal in a communication process between the terminal and the base station, the motion direction and the speed value information provided by the inertial device of the terminal, and in combination with actual channel state information of a trajectory of a previous short distance of the terminal by, the terminal is located, thereby improving the terminal locating precision.

In an example, the step that the trajectory corresponding to each initial locating position of the plurality of initial locating positions is respectively obtained by calculating according to the speed information includes: a reading interval of channel state information is acquired; and trajectory points before each initial locating position of the plurality of initial locating positions are obtained by calculating according to the speed information and the reading interval, and the trajectory corresponding to each initial locating position of the plurality of initial locating positions is acquired according to the obtained trajectory points before the each initial locating position and the each initial locating position.

As at least one alternative embodiment, the reading interval of the channel state information may be pre-stored in the terminal. The reading interval of the channel state information may be determined according to an attribute of a locating device of the terminal.

For example, assuming that a current locating position of a terminal P, that is, the initial locating position, is $P_N$, position trajectory points $\{p_1, \ldots, p_N\}$ may be acquired according to the speed information v, where $p_i = p_N - v \cdot \Delta t \cdot (N-i)$, $i=1, 2, \ldots, N$ the position trajectory points $\{p_1, \ldots, p_N\}$ include the current locating position and N−1 previous trajectory points.

In the example described above, the trajectory points before the initial locating position are obtained by calculating according to the speed information and the reading interval.

In an example, the step that theoretical channel state information of trajectory points in the trajectory corresponding to each initial locating position is obtained by calculating according to the position of the base station includes: the theoretical channel state information of the trajectory points in the trajectory corresponding to each initial locating position is obtained by calculating through the following formula, wherein the theoretical channel state information is the theoretical phase value of a direct signal at $P_i$, of the trajectory:

$$\angle CSI_{i,d} = \left(\frac{2\pi|P_{BS} - p_i|f_i}{c}\right) \mod 2\pi$$

$f_i$ denoting a frequency of a communication signal, and $|P_{BS} - p_i|$ denoting a distance between a terminal at position $p_i$ and the base station at position $P_{BS}$.

In an example, the step that a target locating position is determined from the plurality of initial locating positions according to the theoretical channel state information and the actual channel state information includes: a target search function is constructed according to the theoretical channel state information and the actual channel state information; a hologram of the region to be located is acquired according to the target search function; and the target locating position is determined from the plurality of initial locating positions according to the hologram.

As at least one alternative embodiment, the step that a target search function is constructed according to the theoretical channel state information and the actual channel state information includes: the following target search function is constructed according to the theoretical channel state information and the actual channel state information, where it is assumed that a position p(x,y) in the region to be located is the current locating position $p_N$ of the terminal P, a target search function corresponding to the current locating position p(x,y) is $$OSF_{p(x,y)} = |\Sigma_{i=1}^{N} \exp j(\angle CSI_i - \angle CSI_{i,d})|$$

p(x,y) denoting an initial locating position, $OSF_{p(x,y)}$ denoting the target search function at the initial locating position, i=1,2,3, ... N, N denoting the number of trajectory points in a corresponding trajectory, $\angle CSI_i$ denoting the actual channel state information, and $\angle CSI_{i,d}$ denoting the theoretical channel state information.

In the region to be located, the target search function $OSF_{p(x,y)}$ is obtained by calculating for each trajectory point (that is, the initial locating position) with a certain granularity in the region to be located, and thus the hologram $$I = \begin{bmatrix} OSF_{p(x_{min},y_{min})} & \cdots & OSF_{p(x_{min},y_{max})} \\ \vdots & \vdots & \vdots \\ OSF_{p(x_{max},y_{min})} & \cdots & OSF_{p(x_{max},y_{max})} \end{bmatrix}$$

of the region to be located may be constructed, $[x_{min}, x_{max}]$ denoting a range in an x-axis direction and $[y_{min}, y_{max}]$ denoting a range in a y-axis direction, in the region to be located. In other examples, the region to be located may also be a three-dimensional space, and described as a two-dimensional space as an example herein.

Finally, a server finds out a point corresponding to a maximum value in the hologram, which is an estimated position of the terminal, that is, the target locating position.

In the example described above, precise locating in a single-base station environment may be realized, and the influence from a signal multi-path propagation effect may be overcome.

In an example, the step that the plurality of initial locating positions in the region to be located are determined includes: the region to be located and a position sampling granularity are determined, and the plurality of initial locating positions are acquired according to the region to be located and the position sampling granularity.

As at least one alternative embodiment, the sampling granularity is related to the locating precision, and the higher the locating precision is, the finer the sampling granularity is. The terminal may determine the sampling granularity according to preset locating precision, and then divide the region to be located according to the position sampling granularity, so as to obtain the plurality of initial locating positions.

In the example, the locating precision is fully considered, so that more accurate locating is realized.

Figure 3:
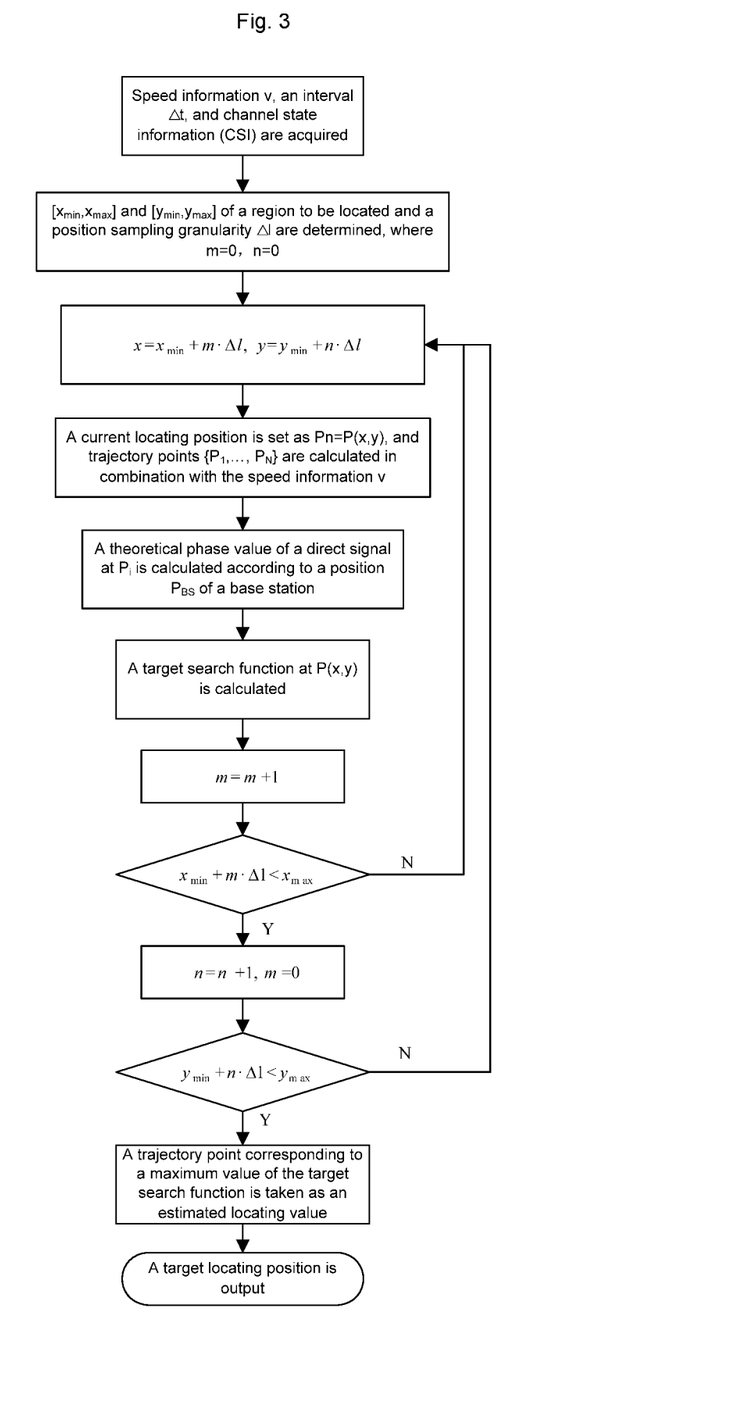
FIG. 3 is a schematic flowchart of a method for locating a terminal according to another one or more examples.

As at least one alternative embodiment, with reference to FIG. 3, a flowchart of a method for locating a terminal in another example is shown.

Figure 4:
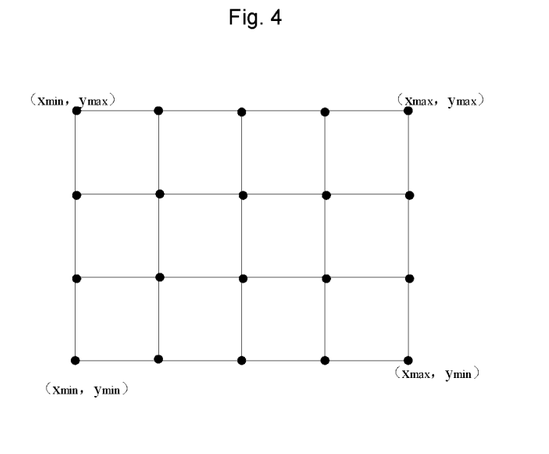
FIG. 4 is a schematic diagram of a region to be located in one or more examples.

In the example, the method for locating the terminal includes:

1, a terminal acquires speed information v, an interval $\Delta t$, and actual channel state information (CSI).
2, the terminal determines $[x_{min}, x_{max}]$ and $[y_{min}, y_{max}]$ of a region to be located and a position sampling granularity $\Delta I$, where m=0, n=0. For example, as shown in FIG. 4, the region to be located is divided according to the position sampling granularity, so as to obtain a plurality of initial locating positions.
3, an initial locating position $x = x_{min} + m\Delta I$, $y = y_{min} + n\Delta I$ is acquired.
4, the current locating point and previous N−1 points are acquired according to the speed information, so as to obtain trajectory points $\{p1, \ldots p_N\}$.
5, theoretical channel state information of a direct signal at $p_i$ is obtained by calculating according to a position $P_{BS}$ of a base station.
6, a target search function at the initial locating position is obtained by calculating.
7, a cycle is performed, that is, m=m+1.
8, $x_{min} + m\Delta I < X_{max}$ is judged, and if not, step 3 continues to be executed, so as to acquire a next initial locating position.
9, if yes, n=n+1 and m=0, and $y_{min} + n\Delta I < y_{max}$ is judged, and if not, step 3 continues to be executed, so as to obtain a next initial locating position.
10, if yes, an initial locating position corresponding to a maximum value of the target search function is an estimated locating value, that is, the target locating position.

In the example described above, when the terminal moves, through phase information provided by the channel state information (CSI) of the mobile terminal in a communication process between the mobile terminal and the base station, a motion direction and the speed value information provided by an inertial device of the mobile terminal, and in combination with measured CSI values of related positions, a hologram in the region to be located is constructed, wherein the related positions include the current locating position and the positions in a short distance before the current locating position. Since a value of the score of a correct position in the hologram is higher, the precise position of the mobile terminal is determined through the hologram. In this way, precise locating of the mobile terminal in a single-base station environment can be realized, and the influence from a signal multi-path propagation effect can be overcome.

It should be understood that while all the steps in the flowcharts in FIGS. 2 and 3 are shown sequentially as indicated by arrows, the steps are not necessarily executed sequentially in an order indicated by the arrows. Unless explicitly stated herein, an execution order of these steps is no strictly limited, and these steps can be executed in other orders. Moreover, at least part of the steps in FIGS. 2 and 3 may include a plurality of sub-steps or stages. These sub-steps or stages are not necessarily executed at the same time, but may be executed at different times. These sub-steps or stages are not necessarily performed sequentially, but may be executed in turn or alternately with other steps or at least part of sub-steps or stages of other steps.

Figure 5:
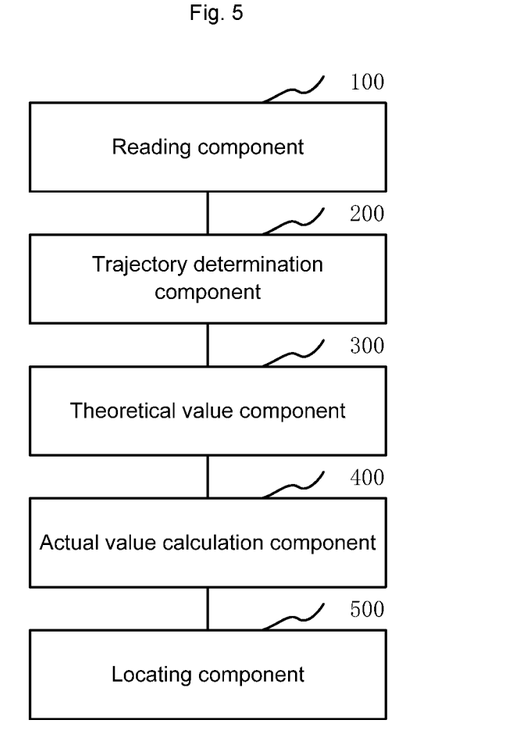
FIG. 5 is a block diagram of an apparatus for locating a terminal according to one or more examples.

In an example, as shown in FIG. 5, an apparatus for locating a terminal is provided. The apparatus for locating the terminal includes: a reading component 100, a trajectory determination component 200, a theoretical value component 300, an actual value calculation component 400, and a locating component 500.

The reading component 100 is configured to read speed information.

The trajectory determination component 200 is configured to determine a plurality of initial locating positions in a region to be located, and respectively obtain a trajectory corresponding to each initial locating position of the plurality of initial locating positions by calculating according to the speed information.

The theoretical value component 300 is configured to acquire a position of a base station, and obtain theoretical channel state information of trajectory points in the trajectory corresponding to each initial locating position by calculating according to the position of the base station.

The actual value calculation component 400 is configured to acquire actual channel state information of the trajectory points in the trajectory corresponding to each initial locating position.

The locating component 500 is configured to determine a target locating position from the plurality of initial locating positions according to the theoretical channel state information and the actual channel state information.

In an example, the trajectory determination component 200 includes:
an interval reading element, configured to acquire a reading interval of channel state information; and
a trajectory generation element, configured to obtain trajectory points before each initial locating position of the plurality of initial locating positions by calculating according to the speed information and the reading interval, and acquire the trajectory corresponding to each initial locating position of the plurality of initial locating positions according to the obtained trajectory points before the each initial locating position and the each initial locating position.

In an example, the theoretical value component 300 is further configured to obtain the theoretical channel state information of the trajectory points in the trajectory corresponding to each initial locating position by calculating through the following formula:

$$LCSI_{i,d} = \left(\frac{2\pi|P_{BS} - p_i|f_i}{c}\right) \mod 2\pi$$

$f_i$ denoting a frequency of a communication signal, and $|P_{BS}-p_i|$ denoting a distance between a terminal at position $p_i$ and the base station at position $P_{BS}$.

In an example, the locating component 500 includes:

a function construction element, configured to construct a target search function according to the theoretical channel state information and the actual channel state information;

a hologram generation element, configured to acquire a hologram of the region to be located according to the target search function; and a locating unit, configured to determine the target locating position from the plurality of initial locating positions according to the hologram.

In an example, the locating element described above is further configured to construct the following target search function according to the theoretical channel state information and the actual channel state information:

$$OSF_{p(x,y)} = |\Sigma_{i=1}^{N} \exp j(\angle CSI_i - \angle CSI_{i,d})|$$

p(x,y) denoting the initial locating position, $OSF_{p(x,y)}$ denoting a target search function at the initial locating position, i=1,2,3, . . . N, N denoting the number of trajectory points in a corresponding trajectory, $\angle CSI_i$ denoting the actual channel state information, and $\angle CSI_{i,d}$ denoting the theoretical channel state information.

In an example, the trajectory determination component 200 described above is further configured to determine the region to be located and a position sampling granularity, and acquire the plurality of initial locating positions according to the region to be located and the position sampling granularity.

Reference may be made to the above limitation on the method for locating a terminal for the specific limitation on the apparatus for locating a terminal, which will not be repeated herein. Each module in the apparatus for locating a terminal described above may be implemented through software, hardware, or a combination thereof in all or in part. Each module described above may be embedded in or independent of a processor in a computer device in a form of hardware, or stored in a memory in the computer device in a form of software, so that the processor calls and executes an operation corresponding to each module described above.

Figure 6:
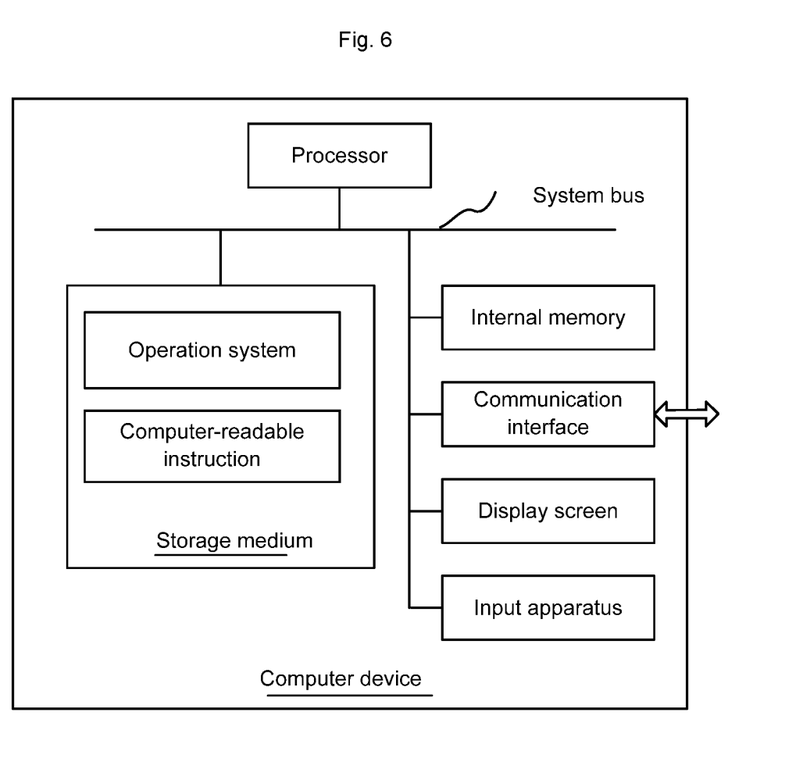
FIG. 6 is a block diagram of a computer device according to one or more examples.

In an example, a computer device is provided. The computer device may be a terminal, an internal structural diagram of which may be as shown in FIG. 6. The computer device includes a processor, a memory, a communication interface, a display screen, and an input apparatus which are connected through a system bus. The processor of the computer device is configured for providing calculation and control capacities. The memory of the computer device includes a non-volatile storage medium and an internal memory. The non-volatile storage medium stores an operation system and a computer program. The internal memory provides an execution environment for the operation system and the computer program in the non-volatile storage medium. The communication interface of the computer device is configured for communicating with an external terminal in a wired or wireless manner. The wireless manner may be implemented through wireless fidelity (Wi-Fi), a carrier network, a near field communication (NFC), etc. The computer program implements a method for locating a terminal when executed by the processor. The display screen of the computer device may be a liquid crystal display screen or an electronic ink display screen. The input apparatus of the computer device may be a touch layer covered with the display screen, or a key, a trackball, or a touch pad arranged on a housing of the computer device, or an external keyboard, a touch pad, or a mouse.

Those skilled in the art can understand that the structure shown in FIG. 6 is merely a block diagram of part of the structure related to the solution of the disclosure, and does not constitute the limitation on the computer device to which the solution of the disclosure is applied. A specific computer device can include more or less components than those shown in the figure, or combine some components, or have a different component arrangement.

Provided is a computer device. The computer device includes a memory and at least one processor. The memory stores a computer-readable instruction. When executed by the at least one processor, the computer-readable instruction causes at least one processor to execute the following actions: reading speed information; determining a plurality of initial locating positions in a region to be located, and respectively obtaining a trajectory corresponding to each initial locating position of the plurality of initial locating positions by calculating according to the speed information; acquiring a position of a base station, and obtaining theoretical channel state information of trajectory points in the trajectory corresponding to each initial locating position by calculating according to the position of the base station; acquiring actual channel state information of the trajectory points in the trajectory corresponding to each initial locating position; and determining a target locating position from the plurality of initial locating positions according to the theoretical channel state information and the actual channel state information.

In an example, when the computer-readable instruction is executed by the at least one processor, the step of respectively obtaining the trajectory corresponding to each initial locating position of the plurality of initial locating positions by calculating according to the speed information includes: acquiring a reading interval of channel state information; and obtaining trajectory points before each initial locating position of the plurality of initial locating positions by calculating according to the speed information and the reading interval, and acquiring the trajectory corresponding to each initial locating position of the plurality of initial locating positions according to the obtained trajectory points before the each initial locating position and the each initial locating position.

In an example, when the computer-readable instruction is executed by the at least one processor, the step of obtaining the theoretical channel state information of trajectory points in the trajectory corresponding to each initial locating position by calculating according to the position of the base station includes: obtaining the theoretical channel state information of the trajectory points in the trajectory corresponding to each initial locating position by calculating through following formula:

$$LCSI_{i,d} = \left(\frac{2\pi|P_{BS} - p_i|f_i}{c}\right) \mod 2\pi$$

$f_i$ denoting a frequency of a communication signal, and $|P_{BS}-p_i|$ denoting a distance between a terminal at position $p_i$ and the base station at position $P_{BS}$.

In an example, when the computer-readable instruction is executed by the at least one processor, the step of determining the target locating position from the plurality of initial locating positions according to the theoretical channel state information and the actual channel state information includes: constructing a target search function according to the theoretical channel state information and the actual channel state information; acquiring a hologram of the region to be located according to the target search function; and determining the target locating position from the plurality of initial locating positions according to the hologram.

In an example, when the computer-readable instruction is executed by the at least one processor, the step of constructing the target search function according to the theoretical channel state information and the actual channel state information includes: constructing a following form of the target search function according to the theoretical channel state information and the actual channel state information:

$$OSF_{p(x,y)}=|\Sigma_{i=1}^{N} exp\ j(\angle CSI_i - \angle CSI_{i,d})|$$

p(x,y) denoting an initial locating position, $OSF_{p(x,y)}$ denoting the target search function at the initial locating position p(x,y), i=1,2,3, ... N, N denoting the number of trajectory points in a corresponding trajectory, $\angle CSI_i$ denoting the actual channel state information, and $\angle CSI_{i,d}$ denoting the theoretical channel state information.

In an example, when the computer-readable instruction is executed by the at least one processor, the step of determining the plurality of the initial locating positions in the region to be located includes: determining the region to be located and a position sampling granularity, and acquiring the plurality of initial locating positions according to the region to be located and the position sampling granularity.

Further provided is a computer-readable storage media storing a computer-readable instruction. When executed by at least one processor, the computer-readable instruction causes the at least one processor to execute the following actions: reading speed information; determining a plurality of initial locating positions in a region to be located, and respectively obtaining a trajectory corresponding to each initial locating position of the plurality of initial locating positions by calculating according to the speed information; acquiring a position of a base station, and obtaining theoretical channel state information of trajectory points in the trajectory corresponding to each initial locating position by calculating according to the position of the base station; acquiring actual channel state information of the trajectory points in the trajectory corresponding to each initial locating position; and determining a target locating position from the plurality of initial locating positions according to the theoretical channel state information and the actual channel state information.

The computer-readable storage medium may be non-volatile or volatile.

In an example, when the computer-readable instruction is executed by the at least one processor, the step of respectively obtaining the trajectory corresponding to each initial locating position of the plurality of initial locating positions by calculating according to the speed information includes: acquiring a reading interval of channel state information; and calculating trajectory points before each initial locating position of the plurality of initial locating positions according to the speed information and the reading interval, and acquiring the trajectory corresponding to each initial locating position of the plurality of initial locating positions according to the obtained trajectory points before the each initial locating position and the each initial locating position.

In an example, when the computer-readable instruction is executed by the at least one processor, the step of obtaining the theoretical channel state information of trajectory points in the trajectory corresponding to each initial locating position by calculating according to the position of the base station includes: obtaining the theoretical channel state information of the trajectory points in the trajectory corresponding to each initial locating position by calculating through the following formula:

$$\angle CSI_{i,d} = \left(\frac{2\pi |P_{BS} - p_i| f_i}{c}\right) \mod 2\pi$$

$f_i$ denoting a frequency of a communication signal, and $|P_{BS}-p_i|$ denoting a distance between a terminal at position $p_i$ and the base station at position $P_{BS}$.

In an example, when the computer-readable instruction is executed by the at least one processor, the step of determining the target locating position from the plurality of initial locating positions according to the theoretical channel state information and the actual channel state information includes: constructing a target search function according to the theoretical channel state information and the actual channel state information; acquiring a hologram of the region to be located according to the target search function; and determining the target locating position from the plurality of initial locating positions according to the hologram.

In an example, when the computer-readable instruction is executed by the at least one processor, the step of constructing the target search function according to the theoretical channel state information and the actual channel state information includes: constructing a following form of the target search function according to the theoretical channel state information and the actual channel state information:

$$OSF_{p(x,y)}=|\Sigma_{i=1}^{N} exp\ j(\angle CSI_i - \angle CSI_{i,d})|$$

p(x,y) denoting an initial locating position, $OSF_{p(x,y)}$ denoting the target search function at the initial locating position p(x,y), i=1,2,3, ... N, N denoting the number of trajectory points in a corresponding trajectory, $\angle CSI_i$ denoting the actual channel state information, and $\angle CSI_{i,d}$ denoting the theoretical channel state information.

In an example, when the computer-readable instruction is executed by the at least one processor, the step of determining the plurality of the initial locating positions in the region to be located includes: determining the region to be located and a position sampling granularity, and acquiring the plurality of initial locating positions according to the region to be located and the position sampling granularity.

Those of ordinary skill in the art can understand that all or some of flows for implementing the methods in the examples described above can be implemented by instructing related hardware through the computer-readable instruction. The computer-readable instruction can be stored in one non-volatile computer-readable storage medium. The computer-readable instruction can include the flows in the example of each method described above when executed. Any reference to the memory, storage, databases, or other medium used in each example provided by the disclosure can include the non-volatile and/or volatile memory. The non-volatile memory can include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache. By way of illustration rather than limitation, the RAM is available in many forms such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

All technical features in the above examples can be combined with one another randomly. In order to make the description concise, not all possible combinations of all the technical features in the above examples are described. However, as long as there is no contradiction between the combinations of these technical features, the combinations should be deemed as falling within the scope of the description.

The above examples only express several embodiments of the disclosure, and the description thereof is specific and detailed, but should not be interpreted as limiting the scope of the invention patent. It should be noted that those of ordinary skill in the art can also make several improvements and modifications without departing from the concept of the disclosure, and these improvements and modifications should all fall within the scope of protection of the disclosure. Therefore, the scope of protection of the patent of the disclosure should be defined by the claims.

What is claimed is:

1. A method for locating a terminal, comprising:
reading, by the terminal, speed information;
determining a plurality of initial locating positions in a region to be located, and respectively obtaining a trajectory corresponding to each initial locating position of the plurality of initial locating positions by calculating according to the speed information, wherein the plurality of initial locating positions are a plurality of possible target locating positions of the terminal in the region to be located;
acquiring a position of a base station, and obtaining theoretical channel state information of trajectory points in the trajectory corresponding to each initial locating position by calculating according to the position of the base station;
acquiring actual channel state information of the trajectory points in the trajectory corresponding to each initial locating position; and
determining a target locating position from the plurality of initial locating positions according to the theoretical channel state information and the actual channel state information;
wherein respectively obtaining the trajectory corresponding to each initial locating position of the plurality of initial locating positions by calculating according to the speed information comprises: acquiring a reading interval of channel state information; and obtaining trajectory points before each initial locating position of the plurality of initial locating positions by calculating according to the speed information and the reading interval, and acquiring the trajectory corresponding to each initial locating position of the plurality of initial locating positions according to the obtained trajectory points before the each initial locating position and the each initial locating position.

2. The method as claimed in claim 1, wherein obtaining the theoretical channel state information of trajectory points in the trajectory corresponding to each initial locating position by calculating according to the position of the base station comprises:
obtaining the theoretical channel state information of the trajectory points in the trajectory corresponding to each initial locating position by calculating through following formula:

$$\angle CSI_{i,d} = \left(\frac{2\pi|P_{BS} - p_i|f_i}{c}\right) \mod 2\pi$$

$f_i$ denoting a frequency of a communication signal, and $|P_{BS}-p_i|$ denoting a distance between a terminal at position $p_i$ and the base station at position $P_{BS}$.

3. The method as claimed in claim 1, wherein determining the target locating position from the plurality of initial locating positions according to the theoretical channel state information and the actual channel state information comprises:
constructing a target search function according to the theoretical channel state information and the actual channel state information;
acquiring a hologram of the region to be located according to the target search function; and
determining the target locating position from the plurality of initial locating positions according to the hologram.

4. The method as claimed in claim 3, wherein constructing the target search function according to the theoretical channel state information and the actual channel state information comprises:
constructing a following form of the target search function according to the theoretical channel state information and the actual channel state information:

$$OSF_{p(x,y)} = |\Sigma_{i=1}^{N} exp\ j(\angle CSI_i - \angle CSI_{i,d})|$$

p(x,y) denoting an initial locating position, $OSF_{p(x,y)}$ denoting the target search function at the initial locating position p(x,y), i=1,2,3, . . . N, N denoting the number of trajectory points in a corresponding trajectory, $\angle CSI_i$ denoting actual channel state information, and $\angle CSI_{i,d}$ denoting theoretical channel state information.

5. The method as claimed in claim 1, wherein determining the plurality of the initial locating positions in the region to be located comprises:
determining the region to be located and a position sampling granularity, and acquiring the plurality of initial locating positions according to the region to be located and the position sampling granularity.

6. A computer device, comprising a memory and at least one processor, the memory storing a computer-readable instruction, and when executed by the at least one processor, the computer-readable instruction causing the at least one processor to execute following actions:
reading, by the terminal, speed information;
determining a plurality of initial locating positions in a region to be located, and respectively obtaining a trajectory corresponding to each initial locating position of the plurality of initial locating positions by calculating according to the speed information, wherein the plurality of initial locating positions are a plurality of possible target locating positions of the terminal in the region to be located;
acquiring a position of a base station, and obtaining theoretical channel state information of trajectory points in the trajectory corresponding to each initial locating position by calculating according to the position of the base station;

acquiring actual channel state information of the trajectory points in the trajectory corresponding to each initial locating position; and determining a target locating position from the plurality of initial locating positions according to the theoretical channel state information and the actual channel state information;

wherein respectively obtaining the trajectory corresponding to each initial locating position of the plurality of initial locating positions by calculating according to the speed information comprises: acquiring a reading interval of channel state information; and obtaining trajectory points before each initial locating position of the plurality of initial locating positions by calculating according to the speed information and the reading interval, and acquiring the trajectory corresponding to each initial locating position of the plurality of initial locating positions according to the obtained trajectory points before the each initial locating position and the each initial locating position.

7. The computer device as claimed in claim 6, wherein when the computer-readable instruction is executed by the at least one processor, obtaining the theoretical channel state information of trajectory points in the trajectory corresponding to each initial locating position by calculating according to the position of the base station comprises:

obtaining the theoretical channel state information of the trajectory points in the trajectory corresponding to each initial locating position by calculating through following formula:

$$\angle CSI_{i,d} = \left(\frac{2\pi |P_{BS} - p_i| f_i}{c}\right) \mod 2\pi$$

$f_i$ denoting a frequency of a communication signal, and $|P_{BS}\text{-}p_i|$ denoting a distance between a terminal at position $p_i$ and the base station at position $P_{BS}$.

8. The computer device as claimed in claim 6, wherein when the computer-readable instruction is executed by the at least one processor, determining the target locating position from the plurality of initial locating positions according to the theoretical channel state information and the actual channel state information comprises:

constructing a target search function according to the theoretical channel state information and the actual channel state information;

acquiring a hologram of the region to be located according to the target search function; and determining the target locating position from the plurality of initial locating positions according to the hologram.

9. The computer device as claimed in claim 8, wherein when the computer-readable instruction is executed by the at least one processor, constructing the target search function according to the theoretical channel state information and the actual channel state information comprises:

constructing a following form of the target search function according to the theoretical channel state information and the actual channel state information:

$$OSF_{p(x,y)} = |\Sigma_{i=1}^{N} \exp j(\angle CSI_i - \angle CSI_{i,d})|$$

p(x,y) denoting an initial locating position, $OSF_{p(x,y)}$ denoting the target search function at the initial locating position p(x,y), i=1,2,3, . . . N, N denoting the number of trajectory points in a corresponding trajectory, $\angle CSI_i$ denoting actual channel state information, and $\angle CSI_{i,d}$ denoting theoretical channel state information.

10. The computer device as claimed in claim 6, wherein when the computer-readable instruction is executed by the at least one processor, determining the plurality of initial locating positions in the region to be located comprises:

determining the region to be located and a position sampling granularity, and acquiring the plurality of initial locating positions according to the region to be located and the position sampling granularity.

11. A non-volatile computer-readable storage media, storing a computer-readable instruction, when executed by at least one processor, the computer-readable instruction causing the at least one processor to execute following actions:

reading, by the terminal, speed information;

determining a plurality of initial locating positions in a region to be located, and respectively obtaining a trajectory corresponding to each initial locating position of the plurality of initial locating positions by calculating according to the speed information, wherein the plurality of initial locating positions are a plurality of possible target locating positions of the terminal in the region to be located;

acquiring a position of a base station, and calculating theoretical channel state information of trajectory points in the trajectory corresponding to each initial locating position according to the position of the base station;

acquiring actual channel state information of the trajectory points in the trajectory corresponding to each initial locating position; and determining a target locating position from the plurality of initial locating positions according to the theoretical channel state information and the actual channel state information;

wherein respectively obtaining the trajectory corresponding to each initial locating position of the plurality of initial locating positions by calculating according to the speed information comprises: acquiring a reading interval of channel state information; and obtaining trajectory points before each initial locating position of the plurality of initial locating positions by calculating according to the speed information and the reading interval, and acquiring the trajectory corresponding to each initial locating position of the plurality of initial locating positions according to the obtained trajectory points before the each initial locating position and the each initial locating position.

12. The storage media as claimed in claim 11, wherein when the computer-readable instruction is executed by the at least one processor, obtaining the theoretical channel state information of trajectory points in the trajectory corresponding to each initial locating position by calculating according to the position of the base station comprises:

obtaining the theoretical channel state information of the trajectory points in the trajectory corresponding to each initial locating position by calculating through following formula:

$$\angle CSI_{i,d} = \left(\frac{2\pi |P_{BS} - p_i| f_i}{c}\right) \mod 2\pi$$

$f_i$ denoting a frequency of a communication signal, and $|P_{BS}-p_i|$ denoting a distance between a terminal at position $p_i$ and the base station at position $P_{BS}$.

13. The storage media as claimed in claim 11, wherein when the computer-readable instruction is executed by the at least one processor, determining the target locating position from the plurality of initial locating positions according to the theoretical channel state information and the actual channel state information comprises:
constructing a target search function according to the theoretical channel state information and the actual channel state information;
acquiring a hologram of the region to be located according to the target search function; and
determining the target locating position from the plurality of initial locating positions according to the hologram.

14. The storage media as claimed in claim 13, wherein when the computer-readable instruction is executed by the at least one processor, constructing the target search function according to the theoretical channel state information and the actual channel state information comprises:
constructing a following form of the target search function according to the theoretical channel state information and the actual channel state information:

$$OSF_{p(x,y)} = |\Sigma_{i=1}^{N} exp\, j(\angle CSI_i - \angle CSI_{i,d})|$$

$p(x,y)$ denoting an initial locating position, $OSF_{p(x,y)}$ denoting the target search function at the initial locating position $p(x,y)$, $i=1,2,3,\ldots N$, N denoting the number of trajectory points in a corresponding trajectory, $\angle CSI_i$ denoting actual channel state information, and $\angle CSI_{I,d}$ denoting theoretical channel state information.

15. The storage media as claimed in claim 11, wherein when the computer-readable instruction is executed by the at least one processor, determining the plurality of the initial locating positions in the region to be located comprises:
determining the region to be located and a position sampling granularity, and acquiring the plurality of initial locating positions according to the region to be located and the position sampling granularity.

16. The method as claimed in claim 1, wherein determining the target locating position from the plurality of initial locating positions according to the theoretical channel state information and the actual channel state information comprises:
constructing a target search function according to the theoretical channel state information and the actual channel state information;
acquiring a hologram of the region to be located according to the target search function; and determining the target locating position from the plurality of initial locating positions according to the hologram.

17. The method as claimed in claim 2, wherein determining the target locating position from the plurality of initial locating positions according to the theoretical channel state information and the actual channel state information comprises:
constructing a target search function according to the theoretical channel state information and the actual channel state information;
acquiring a hologram of the region to be located according to the target search function; and
determining the target locating position from the plurality of initial locating positions according to the hologram.

* * * * *